UNITED STATES PATENT OFFICE.

OTTO CHRISTIAN HAGEMANN, OF YONKERS, AND CHARLES BASKERVILLE, OF NEW YORK, N. Y.

PROCESS OF EFFECTING CATALYTIC REACTIONS.

1,083,930. Specification of Letters Patent. Patented Jan. 13, 1914.

No Drawing. Application filed February 8, 1913. Serial No. 747,181.

*To all whom it may concern:*

Be it known that we, OTTO CHRISTIAN HAGEMANN, a subject of the King of Great Britain, residing at Yonkers, New York, and CHARLES BASKERVILLE, a citizen of the United States, residing at New York, N. Y., have invented new and useful Improvements in Processes of Effecting Catalytic Reactions, of which the following is a specification.

The present invention relates to improvements in the art of catalysis.

A particularly novel feature in the catalytic process is the use of a catalytic metal, for example nickel or cobalt in a particular physical condition, whereby it may be very effectively held in suspension, and also whereby a small amount of nickel can be used to effect the catalytic reaction on very large amounts of material. Moreover by the use of this particular form of catalyst, the revivification thereof becomes a very simple matter.

In the hydrogenation of fats, fatty oils, fatty acids and their esters, etc., as well as in the preparation of organic substitution products by hydrogenating or hydrogenizing or reduction processes, the various catalyzers, catalysis or contact substances used, such as finely divided nickel, cobalt, etc., are usually employed in a state of minute subdivision, as in the form of a powder, obtained by the reduction of the oxid, hydroxid, carbonate, chlorid, etc., at an adequate temperature, by means of hydrogen, either alone or when precipitated upon some inert, absorptive, refractory carrier or medium as for example, kieselguhr, asbestos, etc. It has been demonstrated by Sabatier and Senderens, as well as by a number of other investigators, that by the intervention or influence of such catalyzers, unsaturated fatty acids or their glycerids may be made to absorb hydrogen, that is, to become hydrogenated, by which means they become "hardened," being converted into corresponding saturated compounds. However, the application of those catalyzers involves a number of serious technical drawbacks and difficulties; for instance, on account of their finely-divided state, they cannot be readily and satisfactorily separated and recovered from the fats, fatty oils, fatty acids, etc., and, owing to their density, the said catalyzers do not remain well suspended in the fat, oil, etc., treated, when such suspension is desired.

The use of a metal precipitated upon an inert carrier, such as kieselguhr, has not given entirely satisfactory results, probably for the reason that only a small part (one side) of the film of the precipitated metal comes into actual contact with the liquid to be reduced and the hydrogen, and the remainder of the metal is consequently inactive, since the reacting materials cannot come into contact therewith. Another serious objection to the use of such a catalyst is that the process of revivifying the same is quite an expensive undertaking, since the metal must be dissolved in an acid, and reprecipitated upon kieselguhr. Also it is rather difficult to separate the catalytic metal completely from the hydrogenized oil, whether in the form of a fine powder or when deposited upon kieselguhr. It has been also found difficult to obtain a catalyzer by precipitation and reduction methods, which is free from oxids and other impurities. It has been ascertained, moreover, that fats, fatty oils, etc., hydrogenated with such finely-divided catalyzers will contain metallic soaps, such as soaps having a nickel base, which are undesirable from economic and hygenic standpoints.

We have found that metals having catalytic activity, for example, nickel, or cobalt, brought into a state of extremely thin films, plates, leaves, or flakes by physical, mechanical, chemical or galvanoplastic processes, as, for example, by the method shown by Thomas A. Edison (U. S. Patent No. 865,688), offers many important technical advantages as catalysts in the hydrogenization of fats, fatty oils, fatty acids and their esters, as well as in effecting gas reactions. These films, plates or flakes are obtainable in a state of high purity, and may be employed for catalytic purposes either in the metallic (pure) state or after being partially oxidized. These leaves or films can readily be prepared, having a thickness of from one twenty-thousandth to one forty-thousandth of an inch, and accordingly the efficiency of a given weight a catalytic metal, for example nickel, when applied in this form, is very great, owing to the large amount of exposed surface. Such films, or flakes, will, on account of their extreme thinness, readily float and remain evenly distributed throughout the whole mass or volume of fats, oils, fatty acids, etc., under treatment. In the treatment of liquids with gases, as well as in catalytic gas reactions, the process can be carried out under any desired amount of pressure. Besides the application of such filmy, flaky, flocculent catalysts in the hydrogenation of fats, fatty oils, fatty acids and their esters, etc., they may be used in such processes as the production of methane from carbon dioxid, the elimination of carbon monoxid from water-gas, and in other gas reactions where nickel, etc., has been found to be advantageous as a catalyzer. These fine, flaky, lamellous films, or leaves of metal, being brought into contact with the hydrogen or other gases on both surfaces or sides, offer singular advantages in hydrogenating, hydrogenizing, and reduction processes, and in effecting gas reactions wherein cobalt, nickel, etc., is a suitable catalyst. In the hydrogenation of fats, fatty oils, fatty acids, and their esters, etc., such metallic films or flakes, act as catalyzers of a reliable and uniform degree of activity.

In addition to the advantages offered by the extreme thinness of the metal, which produces an extremely large surface, there is another characteristic advantage which is worthy of note, namely that the leaves will remain suspended in the oils, or other material under treatment with the greatest facility.

The separation of the finished hydrogenated fats, oils, acids, etc., that is, the "hardened" or partially "hardened" products from the flaky nickel, cobalt, etc., is, we have found, accomplished without difficulty, thus entirely obviating the serious technical drawbacks which lie in the recovery of the products from the catalyzers in a pulverized state.

In the revivification and recovery of the catalyzer for subsequent hydrogenations, we have found that flaky metals, as nickel, etc., admit of great economy, for the flakes retain their physical form. In this revivification we subject the flakes, films, lamellæ, leaves or plates, from which the fat, oil, etc., has been removed, (for example, by extraction with a suitable solvent) to a process of surface oxidation, followed by reduction with hydrogen at, say, 300° C. Said surface oxidation may be conveniently effected by heating to about 300° C., or higher, in a current of oxygen or air in suitable apparatus, or by treatment with oxidizing agents in liquids in which the metallic flakes are suspended. In such a manner, we are enabled to many times restore freshly reduced surfaces to both sides of the metal flakes or films, without having recourse to conversion of the metal into a soluble salt, precipitating, igniting, and reducing. Thus it will be seen that by the use of these extremely thin plates or films, we can greatly cheapen the catalytic processes above referred to, and also cheapen the process of revivifying the catalyst.

In the appended claims, the term "leaves," is intended to cover flakes, films, lamellæ, etc., of the kind above referred to, and this term is not intended to cover a layer or film of a metal such as nickel, deposited upon and carried by the particles of a material such as kieselguhr, pumice stone and the like, since as above stated the advantages of the use of the independently floating filmiform bodies are not secured by the use of a catalyst consisting of a film of metal carried by an inert body.

What we claim is:—

1. In the art of effecting catalytic reactions, the step which comprises bringing together the reacting materials in the presence of a catalytic metal in the form of very thin leaves.

2. In the art of effecting catalytic reactions, the step which comprises bringing together the reacting materials in the presence of a metal of the nickel group in the form of very thin leaves.

3. In the art of effecting catalytic reactions, the step which comprises bringing together the reacting materials in the presence of a metallic nickel in the form of very thin leaves.

4. In the art of effecting catalytic reactions, the step which comprises bringing together hydrogen and a material to be reduced thereby in the presence of a catalytic metal in the form of very thin leaves.

5. In the art of effecting catalytic reactions the step which comprises bringing together hydrogen and a fatty body in the presence of a catalytic metal in the form of very thin leaves.

6. In the art of effecting catalytic reactions, the step which comprises bringing together hydrogen and an oil containing a glycerid of an unsaturated fatty acid in the presence of a catalytic metal in the form of very thin leaves.

7. In the art of effecting catalytic reactions, the step which comprises bringing together the reacting materials in the presence of a catalytic metal in the form of very thin leaves, having the surface thereof partially oxidized.

Signed at New York city, this 7th day of February 1913.

OTTO CHRISTIAN HAGEMANN.
CHARLES BASKERVILLE.

Witnesses:
  W. A. HAUSOR,
  THOMAS F. O'KEEFFE.